United States Patent
Zhang et al.

(10) Patent No.: US 10,880,756 B2
(45) Date of Patent: Dec. 29, 2020

(54) INFORMATION NOTIFICATION METHOD, USER TERMINAL, FIRST BASE STATION, AND SECOND BASE STATION

(71) Applicant: Huawei Technologies Co., Ltd., Shenzhen (CN)

(72) Inventors: Tao Zhang, Beijing (CN); Zhenzhen Cao, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/813,684

(22) Filed: Nov. 15, 2017

(65) Prior Publication Data
US 2018/0077586 A1 Mar. 15, 2018

Related U.S. Application Data

(63) Continuation of application No. PCT/CN2015/079108, filed on May 15, 2015.

(51) Int. Cl.
*H04W 16/32* (2009.01)
*H04W 76/14* (2018.01)
(Continued)

(52) U.S. Cl.
CPC .......... *H04W 16/32* (2013.01); *H04W 48/10* (2013.01); *H04W 48/16* (2013.01); *H04W 68/00* (2013.01);
(Continued)

(58) Field of Classification Search
CPC . H04W 36/0088; H04W 24/10; H04W 72/02; H04W 36/0016; H04W 24/02; H04W 4/70; H04W 76/14
See application file for complete search history.

(56) References Cited

U.S. PATENT DOCUMENTS

2010/0322169 A1 12/2010 Narasimha
2011/0269500 A1 11/2011 Johansson et al.
(Continued)

FOREIGN PATENT DOCUMENTS

CN 102123479 A 7/2011
CN 102474776 A 5/2012
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.5.0, 3rd Generation Partnership Project, Valbonne, France (Mar. 2015).
(Continued)

*Primary Examiner* — Melanie Jagannathan
(74) *Attorney, Agent, or Firm* — Leydig, Voit & Mayer, Ltd.

(57) ABSTRACT

The present application discloses an information notification method, a user terminal, a first base station, and a second base station. UE receives a notification message that is sent by a first base station by using a managed first cell, where the notification message is used to instruct the UE to acquire system information of a second cell managed by a second base station; and the UE acquires, according to the received notification message, the system information of the second cell managed by the second base station. A D2D resource configuration of the second cell changes but is not read by the UE in time, resulting in a problem that the UE uses an expired D2D resource configuration.

12 Claims, 3 Drawing Sheets

(51) Int. Cl.
*H04W 48/10* (2009.01)
*H04W 48/16* (2009.01)
*H04W 68/00* (2009.01)
*H04W 76/15* (2018.01)
*H04W 92/20* (2009.01)
*H04W 48/12* (2009.01)
*H04W 72/04* (2009.01)
*H04W 88/06* (2009.01)
*H04W 88/08* (2009.01)

(52) U.S. Cl.
CPC ........... *H04W 76/14* (2018.02); *H04W 76/15* (2018.02); *H04W 48/12* (2013.01); *H04W 72/042* (2013.01); *H04W 88/06* (2013.01); *H04W 88/08* (2013.01); *H04W 92/20* (2013.01)

(56) References Cited

U.S. PATENT DOCUMENTS

| | | | |
|---|---|---|---|
| 2012/0117155 A1 | 5/2012 | Li | |
| 2012/0270555 A1 | 10/2012 | Wei | |
| 2013/0279284 A1 | 10/2013 | Jeong | |
| 2013/0308551 A1 | 11/2013 | Madan et al. | |
| 2014/0153474 A1* | 6/2014 | Zhao | H04W 36/0083 370/312 |
| 2014/0226629 A1* | 8/2014 | Kim | H04W 36/0016 370/331 |
| 2014/0315562 A1 | 10/2014 | Lim et al. | |
| 2015/0003266 A1* | 1/2015 | Guo | H04W 52/365 370/252 |
| 2015/0119055 A1 | 4/2015 | Shin et al. | |
| 2015/0365518 A1* | 12/2015 | Wu | H04W 76/14 455/552.1 |
| 2016/0021625 A1* | 1/2016 | Li | H04W 72/0446 370/336 |
| 2016/0112858 A1* | 4/2016 | Nguyen | H04W 8/005 370/329 |
| 2016/0112921 A1* | 4/2016 | Nagasaka | H04W 36/22 370/331 |
| 2016/0157172 A1 | 6/2016 | Jeong | |
| 2016/0205678 A1 | 7/2016 | Fujishiro et al. | |
| 2016/0219541 A1* | 7/2016 | Chatterjee | H04W 4/60 |
| 2016/0302250 A1* | 10/2016 | Sheng | H04W 4/70 |
| 2017/0078939 A1* | 3/2017 | Takahashi | H04W 36/24 |
| 2017/0295567 A1* | 10/2017 | Chen | H04W 76/11 |
| 2017/0295602 A1* | 10/2017 | Yu | H04W 48/16 |

FOREIGN PATENT DOCUMENTS

| | | |
|---|---|---|
| CN | 103582077 A | 2/2014 |
| EP | 2869650 A1 | 5/2015 |
| KR | 20150010434 A | 1/2015 |
| WO | 2009022951 A1 | 2/2009 |
| WO | 2015053382 A1 | 4/2015 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12),"3GPP TS 36.331 V12.5.0, 3rd Generation Partnership Project, Valbonne, France (Mar. 2015).

"Direct Discovery transmission on non-PCell," 3GPP TSG-RAN WG2 #90, Fukuoka, Japan, R2-152386, pp. 1-5, 3rd Generation Partnership Project, Valbonne, France (May 25-29, 2015).

"Data flow for D2D intra-cell and inter-cell discovery," 3GPP TSG-RAN WG2 Meeting #85bis, Valencia, Spain, R2-141673, pp. 1-4, 3rd Generation Partnership Project, Valbonne, France (Mar. 31-Apr. 4, 2014).

* cited by examiner

INFORMATION NOTIFICATION METHOD, USER TERMINAL, FIRST BASE STATION, AND SECOND BASE STATION

CROSS-REFERENCE TO RELATED APPLICATIONS

This application is a continuation of International Application No. PCT/CN2015/079108, filed on May 15, 2015, the disclosure of which is hereby incorporated by reference in its entirety.

TECHNICAL FIELD

The present application relates to the field of communications technologies, and in particular, to an information notification method, a user terminal, a first base station, and a second base station.

BACKGROUND

A Device to Device (D2D) communications mode refers to a mode in which user equipment (UE) and UE discover each other to establish a direct link and perform communication by using the established direct link. In this mode, information transmitted between the UEs does not need to be relayed by using a base station.

For ease of description, a cell in which UE is located is referred to as a first cell, and a cell adjacent to the first cell is referred to as a second cell. The first cell and the second cell may be managed by a same base station, or may be managed by different base stations. In the D2D communications mode, when the UE uses a service provided by the first cell, a D2D resource used by the UE to perform D2D communication may be provided by the second cell. In this case, the UE needs to receive system information sent by the second cell, to learn a D2D resource configuration provided by the second cell, so as to perform D2D. Moreover, generally, a D2D resource configuration of the second cell does not remain unchanged all the time; therefore, the UE needs to periodically read the system information of the second cell, to acquire a latest D2D resource configuration provided by the second cell to the UE, so that the latest D2D resource configuration provided by the second cell can be used to perform D2D.

As can be seen from the foregoing, when using the D2D resource configuration provided by the second cell to perform D2D, the UE periodically reads the system information of the second cell. However, generally, a D2D resource configuration of the second cell does not change frequently. In this case, if a period in which the UE reads the system information of the second cell is set to be relatively short, the UE frequently reads the system information of the second cell, resulting in that D2D resource configurations that are provided by the second cell and that are acquired by the UE at different times are the same, which consumes battery power of the UE, thereby shortening a standby time of the UE. If a period in which the UE reads the system information of the second cell is set to be relatively long, a D2D resource configuration of the second cell may have changed but is not read by the UE in time, resulting in a problem that the UE uses an expired D2D resource configuration.

SUMMARY

The present application provides an information notification method, a user terminal, a first base station, and a second base station, which are used to resolve a problem that UE uses an expired D2D resource configuration because a D2D resource configuration of a second cell changes but is not read by the UE in time.

According to a first aspect, an information notification method is provided, including: receiving, by user equipment UE, a notification message that is sent by a first base station by using a managed first cell, where the notification message is used to instruct the UE to acquire system information of a second cell managed by a second base station; and acquiring, by the UE according to the received notification message, the system information of the second cell managed by the second base station.

With reference to the first aspect, in a first possible implementation manner of the first aspect, the notification message includes a cell identifier of the second cell; and the acquiring, by the UE according to the received notification message, the system information of the second cell managed by the second base station includes: acquiring, by the UE according to the cell identifier of the second cell that is included in the received notification message, the system information of the second cell managed by the second base station.

With reference to the first aspect, in a second possible implementation manner of the first aspect, the notification message includes a time at which the system information of the second cell changes; and the acquiring, by the UE according to the received notification message, the system information of the second cell managed by the second base station includes: acquiring, by the UE according to the time at which the system information of the second cell changes and that is in the received notification message, the system information of the second cell managed by the second base station.

With reference to the first aspect, in a third possible implementation manner of the first aspect, the notification message includes changed content of the system information of the second cell; and the acquiring, by the UE according to the received notification message, the system information of the second cell managed by the second base station includes: acquiring, by the UE according to the changed content of the system information of the second cell that is in the received notification message, when determining that the system information of the second cell needs to be reacquired, the system information of the second cell managed by the second base station.

With reference to the first aspect, in a fourth possible implementation manner of the first aspect, the notification message includes information indicating a manner for the UE to acquire the system information of the second cell; and the acquiring, by the UE according to the received notification message, the system information of the second cell managed by the second base station includes: acquiring, by the UE according to the manner that is for acquiring the system information of the second cell and that is indicated by the received notification message, the system information of the second cell managed by the second base station, where the manner for the UE to acquire the system information of the second cell is: reading, by the UE, the system information of the second cell that is broadcast by the second cell; or receiving, by the UE, the system information of the second cell that is sent by the first cell.

With reference to the first aspect, in a fifth possible implementation manner of the first aspect, the acquiring, by the UE according to the received notification message, the system information of the second cell managed by the second base station includes: reading, by the UE according to the received notification message, the system information of the second cell that is broadcast by the second cell; or if the UE is in an idle state, establishing, by the UE, a connection to the first cell, and acquiring the system information of the second cell on the established connection.

According to a second aspect, an information notification method is provided, including: receiving, by a first base station, an indication message sent by a second base station, where the indication message is used to instruct the first base station to send a notification message to user equipment UE; and sending, by the first base station, the notification message to the UE by using a managed first cell, where the notification message is used to instruct the UE to acquire system information of a second cell managed by the second base station.

With reference to the second aspect, in a first possible implementation manner of the second aspect, the receiving, by a first base station, an indication message sent by a second base station includes: directly receiving, by the first base station, the indication message sent by the second base station; or receiving, by the first base station, the indication message sent by the second base station and forwarded by a mobility management entity MME.

With reference to the second aspect or the first possible implementation manner of the second aspect, in a third possible implementation manner of the second aspect, the indication message includes a cell identifier of the second cell; and the notification message sent by the first base station to the UE by using the managed first cell further includes the cell identifier of the second cell.

With reference to the second aspect, in a fourth possible implementation manner of the second aspect, the indication message includes a time at which the system information of the second cell changes; and the notification message sent by the first base station to the UE by using the managed first cell further includes the time at which the system information of the second cell changes.

With reference to the second aspect, in a fifth possible implementation manner of the second aspect, the indication message further includes changed content of the system information of the second cell; and the notification message sent by the first base station to the UE by using the managed first cell further includes the changed content of the system information of the second cell.

With reference to the second aspect, in a sixth possible implementation manner of the second aspect, the indication message further includes information indicating a manner for the UE to acquire the system information of the second cell; and the notification message sent by the first base station to the UE by using the managed first cell further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

With reference to the second aspect, in a seventh possible implementation manner of the second aspect, the sending, by the first base station, the notification message to the UE by using a managed first cell includes: acquiring, by the first base station, UE in a device to device D2D communications mode; and sending, by the first base station, the notification message to the acquired UE by using the managed first cell.

With reference to the second aspect or the seventh possible implementation manner of the second aspect, in an eighth possible implementation manner of the second aspect, the first base station acquires the UE in a D2D communications mode according to at least one of the following manners: acquiring, by the first base station from an MME, the UE in a D2D communications mode; acquiring, by the first base station from the second base station, the UE in a D2D communications mode; or acquiring, by the first base station, the stored UE in a D2D communications mode.

With reference to any one of the second aspect to the eighth possible implementation manner of the second aspect, in a ninth possible implementation manner of the second aspect, the UE in a D2D communications mode includes at least one of the following: UE that performs a D2D communications mode by using a resource configuration provided by the second cell; or UE in a D2D communications mode at a frequency at which the second cell is located.

According to a third aspect, an information notification method is provided, including: determining, by a second base station, whether user equipment UE needs to acquire system information of a second cell managed by the second base station; and when determining that the UE needs to acquire the system information of the second cell managed by the second base station, sending, by the second base station, an indication message to a first base station, where the indication message is used to instruct the first base station to send a notification message to the UE by using a managed first cell, and the notification message is used to instruct the UE to acquire the system information of the second cell managed by the second base station.

With reference to the third aspect, in a first possible implementation manner of the third aspect, the sending, by the second base station, an indication message to a first base station includes: directly sending, by the second base station, the indication message to the first base station; or forwarding, by the second base station, the indication message to the first base station by using a mobility management entity MME.

With reference to the third aspect or the first possible implementation manner of the third aspect, in a second possible implementation manner of the third aspect, the indication message includes a cell identifier of the second cell; and the indication message sent by the second base station to the first base station further includes the cell identifier of the second cell.

With reference to the third aspect or the first possible implementation manner of the third aspect, in a third possible implementation manner of the third aspect, the indication message includes a time at which the system information of the second cell changes; and the indication message sent by the second base station to the first base station further includes the time at which the system information of the second cell changes.

With reference to the third aspect or the first possible implementation manner of the third aspect, in a fourth possible implementation manner of the third aspect, the indication message further includes changed content of the system information of the second cell; and the indication message sent by the second base station to the first base station further includes the changed content of the system information of the second cell.

With reference to the third aspect or the first possible implementation manner of the third aspect, in a fifth possible implementation manner of the third aspect, the indication message further includes information indicating a manner for the UE to acquire the system information of the second cell; and the indication message sent by the second base station to the first base station further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

According to a fourth aspect, a user terminal is provided, including: a receiving module, configured to receive a notification message that is sent by a first base station by using a managed first cell, where the notification message is used to instruct UE to acquire system information of a second cell managed by a second base station; and an acquiring module, configured to acquire, according to the received notification message, the system information of the second cell managed by the second base station.

With reference to the fourth aspect, in a first possible implementation manner of the fourth aspect, the notification message includes a cell identifier of the second cell; and the acquiring module is specifically configured to acquire, according to the cell identifier of the second cell that is included in the received notification message, the system information of the second cell managed by the second base station.

With reference to the fourth aspect, in a second possible implementation manner of the fourth aspect, the notification message includes a time at which the system information of the second cell changes; and the acquiring module is specifically configured to acquire, according to the time at which the system information of the second cell changes and that is in the received notification message, the system information of the second cell managed by the second base station.

With reference to the fourth aspect, in a third possible implementation manner of the fourth aspect, the notification message includes changed content of the system information of the second cell; and the acquiring module is specifically configured to acquire, according to the changed content of the system information of the second cell that is in the received notification message, when it is determined that the system information of the second cell needs to be reacquired, the system information of the second cell managed by the second base station.

With reference to the fourth aspect, in a fourth possible implementation manner of the fourth aspect, the notification message includes information indicating a manner for the UE to acquire the system information of the second cell; and the acquiring module is specifically configured to acquire, according to the manner that is for acquiring the system information of the second cell and that is indicated by the received notification message, the system information of the second cell managed by the second base station, where the manner for acquiring the system information of the second cell is: reading the system information of the second cell that is broadcast by the second cell; or receiving the system information of the second cell that is sent by the first cell.

With reference to the fourth aspect, in a fifth possible implementation manner of the fourth aspect, the acquiring module is specifically configured to: read, according to the received notification message, the system information of the second cell that is broadcast by the second cell; or if the UE is in an idle state, establish a connection to the first cell, and acquire the system information of the second cell on the established connection.

According to a fifth aspect, a first base station is provided, including: a receiving module, configured to receive an indication message sent by a second base station, where the indication message is used to instruct the first base station to send a notification message to user equipment UE; and a sending module, configured to send the notification message to the UE by using a managed first cell, where the notification message is used to instruct the UE to acquire system information of a second cell managed by the second base station.

With reference to the fifth aspect, in a first possible implementation manner of the fifth aspect, the receiving module is specifically configured to directly receive the indication message sent by the second base station; or receive the indication message sent by the second base station and forwarded by a mobility management entity MME.

With reference to the fifth aspect or the first possible implementation manner of the fifth aspect, in a third possible implementation manner of the fifth aspect, the indication message includes a cell identifier of the second cell; and the notification message that the sending module is specifically configured to send to the UE by using the managed first cell further includes the cell identifier of the second cell.

With reference to the fifth aspect, in a fourth possible implementation manner of the fifth aspect, the indication message includes a time at which the system information of the second cell changes; and the notification message that the sending module is specifically configured to send to the UE by using the managed first cell further includes the time at which the system information of the second cell changes.

With reference to the fifth aspect, in a fifth possible implementation manner of the fifth aspect, the indication message further includes changed content of the system information of the second cell; and the notification message that the sending module is specifically configured to send to the UE by using the managed first cell further includes the changed content of the system information of the second cell.

With reference to the fifth aspect, in a sixth possible implementation manner of the fifth aspect, the indication message further includes information indicating a manner for the UE to acquire the system information of the second cell; and the notification message that the sending module is specifically configured to send to the UE by using the managed first cell further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

With reference to the fifth aspect, in a seventh possible implementation manner of the fifth aspect, the first base station further includes: an acquiring module, configured to acquire UE in a device to device D2D communications mode, where the sending module is specifically configured to send the notification message to the acquired UE by using the managed first cell.

With reference to the fifth aspect or the seventh possible implementation manner of the fifth aspect, in an eighth possible implementation manner of the fifth aspect, the acquiring module is specifically configured to acquire the UE in a D2D communications mode according to at least one of the following manners: acquiring, from an MME, the UE in a D2D communications mode; acquiring, from the second base station, the UE in a D2D communications mode; or acquiring the UE in a D2D communications mode stored in the first base station.

With reference to any one of the fifth aspect to the eighth possible implementation manner of the fifth aspect, in a ninth possible implementation manner of the fifth aspect, the UE in a D2D communications mode that is acquired by the acquiring module includes at least one of the following: UE that performs a D2D communications mode by using a resource configuration provided by the second cell; or UE in a D2D communications mode at a frequency at which the second cell is located.

According to a sixth aspect, a second base station is provided, including: a determining module, configured to determine whether user equipment UE needs to acquire system information of a second cell managed by the second base station; and a sending module, configured to: when it is determined that the UE needs to acquire the system information of the second cell managed by the second base station, send an indication message to a first base station, where the indication message is used to instruct the first base station to send a notification message to the UE by using a managed first cell, and the notification message is used to instruct the UE to acquire the system information of the second cell managed by the second base station.

With reference to the sixth aspect, in a first possible implementation manner of the sixth aspect, the sending module is specifically configured to directly send the indication message to the first base station; or forward the indication message to the first base station by using a mobility management entity MME.

With reference to the sixth aspect or the first possible implementation manner of the sixth aspect, in a second possible implementation manner of the sixth aspect, the indication message includes a cell identifier of the second cell; and the indication message that the sending module is specifically configured to send to the first base station further includes the cell identifier of the second cell.

With reference to the sixth aspect or the first possible implementation manner of the sixth aspect, in a third possible implementation manner of the sixth aspect, the indication message includes a time at which the system information of the second cell changes; and the indication message that the sending module is specifically configured to send to the first base station further includes the time at which the system information of the second cell changes.

With reference to the sixth aspect or the first possible implementation manner of the sixth aspect, in a fourth possible implementation manner of the sixth aspect, the indication message further includes changed content of the system information of the second cell; and the indication message that the sending module is specifically configured to send to the first base station further includes the changed content of the system information of the second cell.

With reference to the sixth aspect or the first possible implementation manner of the sixth aspect, in a fifth possible implementation manner of the sixth aspect, the indication message further includes information indicating a manner for the UE to acquire the system information of the second cell; and the indication message that the sending module is specifically configured to send to the first base station further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

According to a seventh aspect, a user terminal is provided, including: a memory, configured to store a program instruction; an interface, configured to receive a notification message that is sent by a first base station by using a managed first cell, where the notification message is used to instruct UE to acquire system information of a second cell managed by a second base station; and a signal processor, configured to acquire, according to the program instruction stored in the memory and the notification message received by the interface, the system information of the second cell managed by the second base station.

With reference to the seventh aspect, in a first possible implementation manner of the seventh aspect, the notification message includes a cell identifier of the second cell; and the signal processor is specifically configured to acquire, according to the cell identifier of the second cell that is included in the received notification message, the system information of the second cell managed by the second base station.

With reference to the seventh aspect, in a second possible implementation manner of the seventh aspect, the notification message includes a time at which the system information of the second cell changes; and the signal processor is specifically configured to acquire, according to the time at which the system information of the second cell changes and that is in the received notification message, the system information of the second cell managed by the second base station.

With reference to the seventh aspect, in a third possible implementation manner of the seventh aspect, the notification message includes changed content of the system information of the second cell; and the signal processor is specifically configured to acquire, according to the changed content of the system information of the second cell that is in the received notification message, when it is determined that the system information of the second cell needs to be reacquired, the system information of the second cell managed by the second base station.

With reference to the seventh aspect, in a fourth possible implementation manner of the seventh aspect, the notification message includes information indicating a manner for the UE to acquire the system information of the second cell; and the signal processor is specifically configured to acquire, according to the manner that is for acquiring the system information of the second cell and that is indicated by the received notification message, the system information of the second cell managed by the second base station, where the manner for acquiring the system information of the second cell is: reading the system information of the second cell that is broadcast by the second cell; or receiving the system information of the second cell that is sent by the first cell.

With reference to the seventh aspect, in a fifth possible implementation manner of the seventh aspect, the signal processor is specifically configured to: read, according to the received notification message, the system information of the second cell that is broadcast by the second cell; or if the UE is in an idle state, establish a connection to the first cell, and acquire the system information of the second cell on the established connection.

According to an eighth aspect, a first base station is provided, including: a memory, configured to store a program instruction; an interface, configured to receive an indication message sent by a second base station, where the indication message is used to instruct the first base station to send a notification message to user equipment UE; and a signal processor, configured to send, according to the program instruction stored in the memory, the notification message to the UE by using a managed first cell, where the notification message is used to instruct the UE to acquire system information of a second cell managed by the second base station.

With reference to the eighth aspect, in a first possible implementation manner of the eighth aspect, the interface is specifically configured to directly receive the indication message sent by the second base station; or receive the indication message sent by the second base station and forwarded by a mobility management entity MME.

With reference to the eighth aspect or the first possible implementation manner of the eighth aspect, in a third possible implementation manner of the eighth aspect, the indication message includes a cell identifier of the second cell; and the notification message that the signal processor is specifically configured to send to the UE by using the first cell managed by the first base station further includes the cell identifier of the second cell.

With reference to the eighth aspect, in a fourth possible implementation manner of the eighth aspect, the indication message includes a time at which the system information of the second cell changes; and the notification message that the signal processor is specifically configured to send to the UE by using the first cell managed by the first base station further includes the time at which the system information of the second cell changes.

With reference to the eighth aspect, in fifth possible implementation manner of the eighth aspect, the indication message includes changed content of the system information of the second cell; and the notification message that the signal processor is specifically configured to send to the UE by using the first cell managed by the first base station further includes the changed content of the system information of the second cell.

With reference to the eighth aspect, in a sixth possible implementation manner of the eighth aspect, the indication message further includes information indicating a manner for the UE to acquire the system information of the second cell; and the notification message that the signal processor is specifically configured to send to the UE by using the first cell managed by the first base station further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

With reference to the eighth aspect, in a seventh possible implementation manner of the eighth aspect, the signal processor is further configured to acquire UE in a device to device D2D communications mode; and send the notification message to the acquired UE by using the first cell managed by the first base station.

With reference to the eighth aspect or the seventh possible implementation manner of the eighth aspect, in an eighth possible implementation manner of the eighth aspect, the signal processor is specifically configured to acquire the UE in a D2D communications mode according to at least one of the following manners: acquiring, from an MME, the UE in a D2D communications mode; acquiring, from the second base station, the UE in a D2D communications mode; or acquiring the UE in a D2D communications mode stored in the first base station.

With reference to any one of the eighth aspect to the eighth possible implementation manner of the eighth aspect, in a ninth possible implementation manner of the eighth aspect, the UE in a D2D communications mode that is acquired by the signal processor includes at least one of the following: UE that performs a D2D communications mode by using a resource configuration provided by the second cell; or UE in a D2D communications mode at a frequency at which the second cell is located.

According to a ninth aspect, a second base station is provided, including: a memory, configured to store a program instruction; a signal processor, configured to determine, according to the program instruction stored in the memory, whether user equipment UE needs to acquire system information of a second cell managed by the second base station; and when it is determined that the UE needs to acquire the system information of the second cell managed by the second base station, send an indication message to a first base station, where the indication message is used to instruct the first base station to send a notification message to the UE by using a managed first cell, and the notification message is used to instruct the UE to acquire the system information of the second cell managed by the second base station.

With reference to the ninth aspect, in a first possible implementation manner of the ninth aspect, the signal processor is specifically configured to directly send the indication message to the first base station; or forward the indication message to the first base station by using a mobility management entity MME.

With reference to the ninth aspect or the first possible implementation manner of the ninth aspect, in a second possible implementation manner of the ninth aspect, the indication message includes a cell identifier of the second cell; and the indication message that the signal processor is specifically configured to send to the first base station further includes the cell identifier of the second cell.

With reference to the ninth aspect or the first possible implementation manner of the ninth aspect, in a third possible implementation manner of the ninth aspect, the indication message includes a time at which the system information of the second cell changes; and the indication message that the signal processor is specifically configured to send to the first base station further includes the time at which the system information of the second cell changes.

With reference to the ninth aspect or the first possible implementation manner of the ninth aspect, in a fourth possible implementation manner of the ninth aspect, the indication message further includes changed content of the system information of the second cell; and the indication message that the signal processor is specifically configured to send to the first base station further includes the changed content of the system information of the second cell.

With reference to the ninth aspect or the first possible implementation manner of the ninth aspect, in a fifth possible implementation manner of the ninth aspect, the indication message further includes information indicating a manner for the UE to acquire the system information of the second cell; and the indication message that the signal processor is specifically configured to send to the first base station further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

By means of the foregoing technical solutions, a second base station sends indication information to a first base station, the first base station sends a notification message to UE according to the received indication information, and the UE receives the notification message that is sent by the first base station by using a managed first cell, and acquires, according to the received notification message, system information of a second cell managed by the second base station; when the system information of the second cell managed by the second base station changes, the UE can be instructed to acquire the changed system information, and the UE does not need to periodically acquire the system information of the second cell, thereby saving battery power of the UE, and extending a standby time of the UE. In addition, when a resource configuration of the second cell changes, the UE may also acquire the changed system information in time.

DESCRIPTION OF EMBODIMENTS

UE frequently reads system information of a second cell, which consumes battery power of the UE, or a period in which UE reads system information of a second cell is set to be relatively long, and it is possible that a D2D resource configuration of the second cell changes but is not read by the UE in time, resulting in a problem that the UE uses an expired D2D resource configuration. In the technical solutions provided in the present application, a second base station sends indication information to a first base station, the first base station sends a notification message to UE according to the received indication information, the UE receives the notification message that is sent by the first base station by using a managed first cell, and acquires, according to the received notification message, system information of a second cell managed by the second base station; when the system information of the second cell managed by the second base station changes, the UE can be instructed to acquire the changed system information, and the UE does not need to periodically acquire the system information of the second cell, thereby saving battery power of the UE, and extending a standby time of the UE. In addition, when a resource configuration of the second cell changes, the UE may also acquire the changed system information in time.

A main implementation principle and a specific implementation manner of the technical solutions of embodiments of the present application, and a beneficial effect that can be achieved correspondingly by the technical solutions are described below in detail with reference to accompanying drawings.

Embodiment 1

Figure 1:
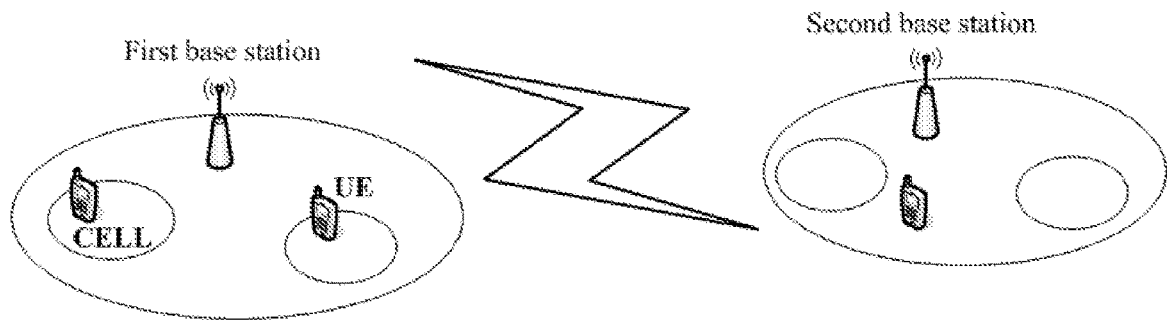
FIG. 1 is a schematic structural composition diagram of an information notification system according to the present application.

Embodiment 1 of the present application provides an information notification system. For ease of description, cells and base stations are distinguished by using "first" and "second". As shown in FIG. 1, the system includes at least one first cell, at least one second cell, and at least one UE, and may further include at least one mobility management entity (MME) (not shown in the figure).

For ease of description, a base station to which a first cell belongs is referred to as a first base station, and a base station to which a second cell belongs is referred to as a second base station. In the following description, a first cell of a first base station and a first cell managed by a first base station have the same meaning, and a second cell of a second base station and a second cell managed by a second base station have the same meaning. The second base station and the first base station may be different base stations, or may be the same base station. When the second base station and the first base station are the same base station, in each embodiment, information exchange between the second base station and the first base station is information exchange between modules inside the same base station.

In the information notification system provided by Embodiment 1 of the present application, multiple second cells may exist at a same frequency, and UE may transmit data in a second cell by using a D2D communications mode.

A second base station is configured to send an indication message, where the indication message is used to instruct a first base station to send a notification message to the UE.

The second base station may directly send the indication message to an MME, and the MME sends the indication message to the first base station; or the second base station may directly send the indication message to the first base station.

The indication message sent by the second base station may include at least one of the following information:

First: A cell identifier of a second cell managed by the second base station.

The identifier of the second cell managed by the second base station may be cell identifiers of all second cells managed by the second base station or may be an identifier of the second cell in which the system information changes.

In a preferable implementation manner, in a technical solution provided in Embodiment 1 of the present application, if the indication message includes the cell identifier of the second cell, the second cell is a cell in which the system information changes.

The cell identifier includes at least one of the following manners:

A: The cell identifier may be a physical cell identifier (PCI) of the cell and an identifier of a frequency at which the cell is located.

In the technical solution provided in Embodiment 1 of the present application, cells at different frequencies may share one PCI. Therefore, when a PCI is used to identify a cell, the PCI needs to be combined with a frequency identifier, thereby improving accuracy of cell identification.

B: The cell identifier may be an evolved universal mobile communications system terrestrial radio access network cell global identifier (ECGI) of the cell.

Second: A time at which the system information of the second cell changes.

The time at which the system information of the second cell changes may be a system frame number (SFN). The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station for the UE.

Third: Changed content of the system information of the second cell.

The manner may be content that will change in the system information of the second cell. The content that will change in the system information of the second cell may include at least one of the following:

A: A D2D resource configuration.

That is, a receiving or sending resource used by the UE to perform D2D in the second cell.

B: A cell reselection configuration.

C: A block of the system information.

For example, if a D2D resource configuration of the second cell will change, the indication message includes an indication indicating the D2D resource configuration will change. If a cell reselection configuration of the second cell will change, the indication message includes an indication indicating the cell reselection configuration will change. If a system information block 19 (SIB19) of the second cell will change, the indication message includes an indication indicating the SIB19 will change.

Fourth: All or a part of the system information of the second cell.

In the manner, the indication message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

Fifth: A manner for the UE to acquire the system information of the second cell.

The indication message may further include information indicating a manner for the UE to acquire the system information of the second cell. The information indicates which manner the UE should use to acquire the system information of the second cell.

The UE acquires the system information of the second cell in two main manners:

A: The UE directly reads a system broadcast of the second cell to acquire the system information of the second cell.

B: The UE receives the system information of the second cell that is sent by the first base station.

Specifically, the indication message may include a list of cells, and indicates that all system information of the cells included in the list needs to be acquired by the UE by using one of foregoing manner A or manner B; or, the indication message may include a list of frequencies, and indicates that all system information of cells at the frequencies included in the list needs to be acquired by the UE by using one of the foregoing manner A or manner B; or, the indication message may include a list of public land mobile networks (PLMN), and indicates that all system information of cells on the PLMNs included in the list needs to be acquired by the UE by using one of the foregoing manner A or manner B.

The first base station is configured to receive the indication message sent by the second base station, and send the notification message to the UE by using a managed first cell.

According to different receiving objects of the indication message sent by the second base station, the first base station may directly receive the indication message sent by the second base station, or may acquire, from the MME, the indication message sent by the second base station.

The first base station may acquire, from the acquired indication message, at least one of the following information:

First: A cell identifier of the second cell managed by the second base station.

The identifier of the second cell managed by the second base station may be cell identifiers of all second cells managed by the second base station or may be an identifier of the second cell in which the system information changes.

In a preferable implementation manner, in the technical solution provided in Embodiment 1 of the present application, if the indication message includes the cell identifier of the second cell, the second cell is a cell in which the system information changes.

The cell identifier includes at least one of the following manners:

A: The cell identifier may be a PCI of the cell and an identifier of a frequency at which the cell is located.

In the technical solution provided in Embodiment 1 of the present application, cells at different frequencies may share one PCI. Therefore, when a PCI is used to identify a cell, the PCI needs to be combined with a frequency identifier, thereby improving accuracy of cell identification.

B: The cell identifier may be an ECGI of the cell.

Second: A time at which the system information of the second cell changes.

The time at which the system information of the second cell changes may be an SFN. The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station for the UE.

Third: Changed content of the system information of the second cell.

The manner may be content that will change in the system information of the second cell. The content that will change in the system information of the second cell may include at least one of the following:

A: A D2D resource configuration.

That is, a receiving or sending resource used by the UE to perform D2D in the second cell.

B: A cell reselection configuration.

C: A block of the system information.

For example, if a D2D resource configuration of the second cell will change, the indication message includes an indication indicating the D2D resource configuration will change. If a cell reselection configuration of the second cell will change, the indication message includes an indication indicating the cell reselection configuration will change. If a system information block 19 (SIB19) of the second cell will change, the indication message includes an indication indicating the SIB19 will change.

Fourth: All or a part of the system information of the second cell.

In the manner, the indication message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

Fifth: A manner for the UE to acquire the system information of the second cell.

The indication message may further include information indicating a manner for the UE to acquire the system information of the second cell. The information indicates which manner the UE should use to acquire the system information of the second cell.

The UE acquires the system information of the second cell in two main manners:

A: The UE reads a system broadcast of the second cell to acquire the system information of the second cell.

B: The UE receives the system information of the second cell that is sent by the first base station.

Specifically, the indication message may include a list of cells, and indicates that all system information of the cells included in the list needs to be acquired by the UE by using one of foregoing manner A or manner B; or, the indication message may include a list of frequencies, and indicates that all system information of cells at the frequencies included in the list needs to be acquired by the UE by using one of the foregoing manner A or manner B; or, the indication message may include a list of PLMNs, and indicates that all system information of cells on the PLMNs included in the list needs to be acquired by the UE by using one of the foregoing manner A or manner B.

As can be seen from the foregoing, according to the information included in the indication message received by the first base station, the notification message sent by the first base station to the UE may include the information acquired in the indication message, such as the cell identifier of the second cell managed by the second base station, the time at which the system information of the second cell changes, the changed content of the system information of the second cell, all or a part of the system information of the second cell, and the information indicating a manner for the UE to acquire the system information of the second cell. For specific details, reference is made to the detailed descriptions in the foregoing content, and no further details are provided.

In the foregoing technical solution provided in this embodiment of the present application, when not receiving the indication message sent by the second base station, the first base station may also send the notification message to the UE. In this case, the information in the notification message is generated by the first base station, instead of being sent by the second base station to the first base station by using the indication message. For example, if the second base station does not send the indication message to the first base station, and the first base station determines that the UE needs to acquire the system information of the second cell of the second base station, and determines a manner for the UE to acquire the system information, the first base station may send the notification message to the UE, where the message includes the manner that is determined by the first base station and that is for the UE to acquire the system information of the second cell of the second base station.

After receiving the indication message sent by the second base station, the first base station may also perform appropriate transformation on some information carried in the indication message, then place new information acquired through the transformation into the notification message, and send the notification message to the UE. For example, the first base station receives the indication message sent by the second base station, where the indication message includes a time at which the system information of the second cell changes, but the time is an SFN of a second cell, and the first base station may transform the SFN of the second cell into an SFN of a first cell, and then use the SFN of the first cell that is acquired through the transformation as the time at which the system information of the second cell changes, place the time into the notification message, and send the notification message to the UE.

That the first base station sends the notification message to the UE may be sending the notification message to all UEs in the first cell, or may be sending the notification message to UE in a D2D communications mode that is in the first cell.

If the first base station sends the notification message to the UE in the D2D communications mode that is in the first cell, the first base station needs to learn which UEs are in a D2D communications mode.

The UE in a D2D communications mode includes at least one of the following:

A: UE in a D2D mode that is in the second cell.

In the manner, UE in a D2D mode that is in the second cell refers to UE that performs a D2D communications mode by using a resource configuration provided by the second cell.

B: UE in a D2D mode that is at a frequency at which the second cell is located.

The first base station learns which UEs are in a D2D communications mode according to at least one of the following manners:

A first manner: The first base station learns the UE in a D2D communications mode from an MME.

In the manner, the first base station acquires, from the MME, the UE in a D2D communications mode.

A second manner: The first base station acquires, from the second base station, the UE in a D2D communications mode.

A third manner: The first base station acquires the stored UE in a D2D communications mode.

In the manner, the first base station pre-stores the information about which UEs are in a D2D communications mode.

In the foregoing three manners, before transmitting data by using a D2D communications mode, the UE needs to perform authentication on the MME, the second base station, or the first base station, and only when the authentication on the MME, the second base station, or the first base station succeeds, the UE can transmit the data in the D2D communications mode. Therefore, one or all of the second base station, the MME, or the first base station stores the information about which UEs are in a D2D communications mode.

UE is configured to receive a notification message that is sent by a first base station by using a managed first cell, and the UE acquires, according to the received notification message, system information of a second cell managed by a second base station.

The notification message received by the UE is used to instruct the UE to acquire the system information of the second cell managed by the second base station.

The notification message received by the UE may include at least one of the following information:

First: A cell identifier of the second cell managed by the second base station.

The identifier of the second cell managed by the second base station may be cell identifiers of all second cells managed by the second base station or may be an identifier of the second cell in which the system information changes.

In a preferable implementation manner, in the technical solution provided in Embodiment 1 of the present application, if the notification message includes the cell identifier of the second cell, the second cell is a cell in which the system information changes.

The cell identifier includes at least one of the following manners:

A: The cell identifier may be a PCI of the cell and an identifier of a frequency at which the cell is located.

In the technical solution provided in Embodiment 1 of the present application, cells at different frequencies may share one PCI. Therefore, when a PCI is used to identify a cell, the PCI needs to be combined with a frequency identifier, thereby improving accuracy of cell identification.

B: The cell identifier may be an ECGI of the cell.

In the manner, the UE acquires, according to the received notification message, the system information of the second cell managed by the second base station, where the second cell is a second cell corresponding to a cell identifier in the notification message.

Second: A time at which the system information of the second cell changes.

The time at which the system information of the second cell changes may be an SFN. The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station for the UE.

In the manner, the UE acquires, according to the time at which the system information of the second cell changes and that is in the received notification message, the system information of the second cell managed by the second base station.

In a preferable implementation manner, if the notification message further includes the cell identifier, the UE acquires, according to the time at which the system information of the second cell changes and that is in the received notification message, the system information of the second cell corresponding to the cell identifier. For example, the UE may acquire the system information of the second cell at a moment indicated by the information.

In the manner, if the notification message sent by the first base station and received by the UE does not include the time at which the system information of the second cell changes, the UE may acquire the time at which the system information of the second cell changes in the following two manners:

1) When the notification message is received, the system information of the second cell corresponding to a second cell identifier is acquired.

When receiving the notification message sent by the first base station, the UE immediately starts to acquire the system information, in the notification message, of the second cell corresponding to the second cell identifier.

2) The UE determines, according to a time at which the notification message is received, a time to acquire the system information of the second cell, and when the time to acquire the system information of the second cell is reached, acquires the system information of the second cell corresponding to the second cell identifier.

For example, the time may be divided in advance into several continuous system information modification periods (MP), where each MP includes several continuous system frames (SF) of the first cell. If the first base station has sent the notification message to the UE in the $N^{th}$ MP, the UE starts to read the system broadcast of the second cell in the $(N+m)^{th}$ MP to acquire the system information of the second cell, or the UE starts to initiate a connection request to the first base station in the $(N+m)^{th}$ MP to receive, on the established connection, the system information of the second cell that is sent by the first base station, where a value of m may be 1, 2, 3, or the like, or a value of m may be by default, or pre-configured by the first base station for the UE.

Third: Changed content of the system information of the second cell.

The manner may be about which content in the system information of the second cell will change. The UE acquires, according to the changed content of the system information of the second cell that is in the received notification message, when determining that the system information of the second cell needs to be reacquired, the system information of the second cell managed by the second base station.

In the manner, the notification message includes information about which content in the system information of the second cell will change, and the UE may determine accordingly whether the system information of the second cell needs to be reacquired. The UE determines, according to the information, indicated by the notification message, about which content in the system information of the second cell will change, whether the system information of the second cell needs to be reacquired, and after determining that the system information of the second cell needs to be reacquired, acquires the system information of the second cell corresponding to the second cell identifier.

The content that will change in the system information of the second cell may include at least one of the following:

A: A D2D resource configuration.

That is, a receiving or sending resource used by the UE to perform D2D in the second cell.

B: A cell reselection configuration.

C: A block of the system information.

For example, if a D2D resource configuration of the second cell will change, the notification message includes an indication indicating the D2D resource configuration will change. If a cell reselection configuration of the second cell will change, the notification message includes an indication indicating that the cell reselection configuration will change. If a system information block 19 (SIB19) of the second cell will change, the notification message includes an indication indicating that the SIB19 will change.

For example, when the notification message includes the information that the D2D resource configuration in the system information of the second cell will change, UE that is using the D2D resource configuration of the second cell needs to reacquire the system information of the second cell, and another UE may not acquire the system information of the second cell.

For another example, when the notification message includes the information that the SIB19 in the system information of the second cell will change, UE that is using the SIB19 of the second cell needs to reacquire the system information of the second cell, and another UE may not acquire the system information of the second cell.

Fourth: All or a part of the system information of the second cell.

In the manner, the notification message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

Fifth: A manner for the UE to acquire the system information of the second cell.

The notification message may further include information indicating a manner for the UE to acquire the system information of the second cell. The information indicates which manner the UE should use to acquire the system information of the second cell. The UE acquires, according to the manner that is for acquiring the system information of the second cell and that is in the received notification message, the system information of the second cell managed by the second base station.

The UE acquires the system information of the second cell in two main manners:

A: The UE reads a system broadcast of the second cell to acquire the system information of the second cell.

B: The UE receives the system information of the second cell that is sent by the first base station.

Specifically, the notification message may include a list of cells, and indicates that all system information of the cells included in the list needs to be acquired by the UE by using one of foregoing manner A or manner B; or, the notification message may include a list of frequencies, and indicates that all system information of cells at the frequencies included in the list needs to be acquired by the UE by using one of the foregoing manner A or manner B; or, the notification message may include a list of PLMNs, and indicates that all system information of cells on PLMNs included in the list needs to be acquired by the UE by using one of the foregoing manner A or manner B.

When the notification message includes all or a part of the system information of the second cell, the UE directly acquires the system information of the second cell from the notification message. When the notification message does not include all or a part of the system information of the second cell, the UE selects one of the foregoing two manners according to the fifth information to acquire the system information of the second cell. If the fifth information indicates that the UE uses the first manner to acquire the system information of the second cell, the UE reads the system broadcast of the second cell to acquire the system information of the second cell.

The UE may acquire, according to the received notification message by using the first base station, the system information of the second cell that is broadcast by the second cell, or the UE reads, according to the received notification message, the system information of the second cell that is broadcast by the second cell.

If the UE is in an idle state, the UE establishes a connection to the first cell, and acquires the system information of the second cell on the established connection.

If the fifth information indicates that the UE uses the second manner to acquire the system information of the second cell, when the UE and the first base station have a connection, the UE receives, on the connection, the system information of the second cell that is sent by the first base station; when the UE and the first base station have no connection or the UE is in an idle state, the UE initiates a connection request to the first base station to establish a connection to the first base station and receives, on the established connection, the system information of the second cell that is sent by the first base station.

Embodiment 2

Based on the system architecture shown in FIG. 1, Embodiment 2 of the present application provides an information notification method. For ease of description, cells and base stations are distinguished by using "first" and "second". A base station to which a first cell belongs is referred to as a first base station, and a base station to which a second cell belongs is referred to as a second base station. In the following description, a first cell of a first base station and a first cell managed by a first base station have the same meaning, and a second cell of a second base station and a second cell managed by a second base station have the same meaning. The second base station and the first base station may be different base stations, or may be the same base station. When the second base station and the first base station are the same base station, in each embodiment, information exchange between the second base station and the first base station is information exchange between modules inside the same base station.

Figure 2:
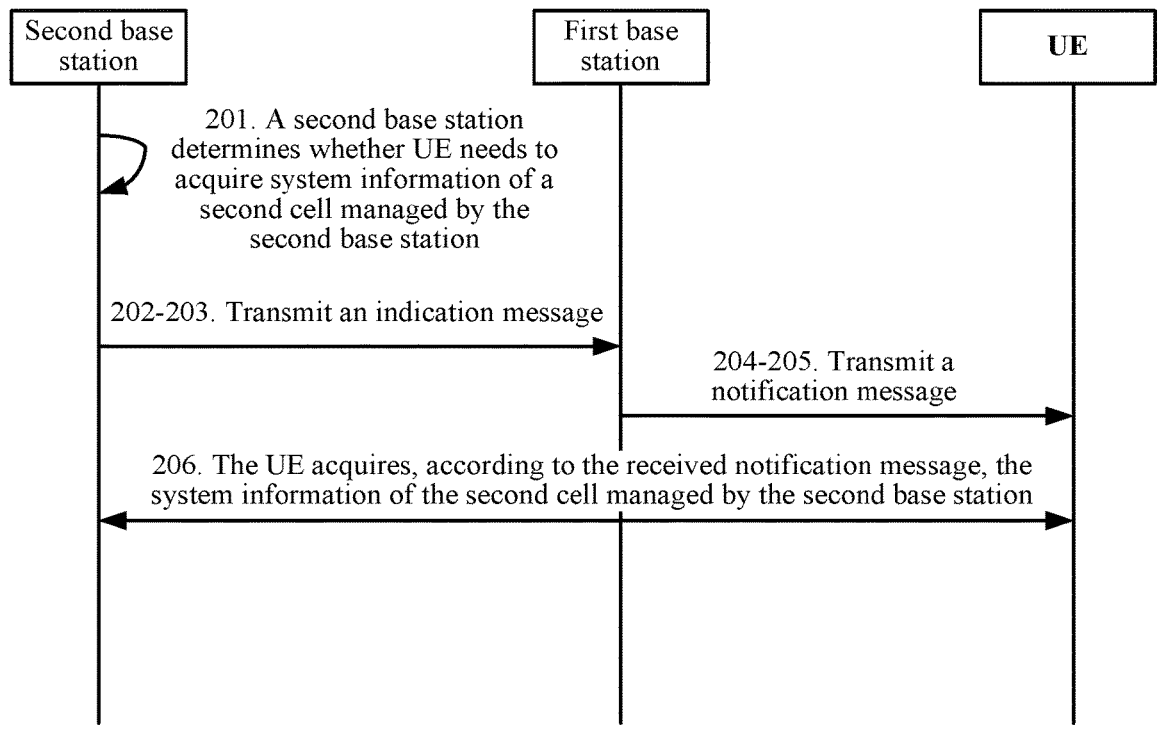
FIG. 2 is a flowchart of an information notification method according to Embodiment 2 of the present application.

In the information notification method provided in Embodiment 2 of the present application, multiple second cells may exist at a same frequency, and UE may transmit data in a second cell by using a D2D communications mode. As shown in FIG. 2, a specific processing procedure is as follows.

Step 201: A second base station determines whether UE needs to acquire system information of a second cell managed by the second base station, and if a determining result is yes, perform 202; otherwise, end the processing.

Step 202: When it is determined that the UE needs to acquire the system information of the second cell managed by the second base station, the second base station sends an indication message to a first base station.

The indication message is used to instruct the first base station to send a notification message to the UE by using a managed first cell, where the notification message is used to instruct the UE to acquire the system information of the second cell managed by the second base station.

The second base station may directly send the indication message to an MME, and the MME sends the indication message to the first base station; or the second base station may directly send the indication message to the first base station.

The indication message sent by the second base station may include at least one of the following information:

First: A cell identifier of the second cell managed by the second base station.

The identifier of the second cell managed by the second base station may be cell identifiers of all second cells managed by the second base station or may be an identifier of the second cell in which the system information changes.

In a preferable implementation manner, in the technical solution provided in Embodiment 2 of the present application, if the indication message includes the cell identifier of the second cell, the second cell is a cell in which the system information changes.

The cell identifier includes at least one of the following manners:

A: The cell identifier may be a PCI of the cell and an identifier of a frequency at which the cell is located.

In the technical solution provided in Embodiment 2 of the present application, cells at different frequencies may share one PCI. Therefore, when a PCI is used to identify a cell, the PCI needs to be combined with a frequency identifier, thereby improving accuracy of cell identification.

B: The cell identifier may be an ECGI of the cell.

Second: A time at which the system information of the second cell changes.

The time at which the system information of the second cell changes may be a system frame number (SFN). The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station for the UE.

Third: Changed content of the system information of the second cell.

The manner may be content that will change in the system information of the second cell. The content that will change in the system information of the second cell may include at least one of the following:

A: A D2D resource configuration.

That is, a receiving or sending resource used by the UE to perform D2D in the second cell.

B: A cell reselection configuration.

C: A block of the system information.

For example, if a D2D resource configuration of the second cell will change, the indication message includes an indication indicating that the D2D resource configuration will change. If a cell reselection configuration of the second cell will change, the indication message includes an indication that the cell reselection configuration will change. If a system information block 19 (SIB19) of the second cell will change, the indication message includes an indication that the SIB19 will change.

Fourth: All or a part of the system information of the second cell.

In the manner, the indication message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

Fifth: A manner for the UE to acquire the system information of the second cell.

The indication message may further include information indicating a manner for the UE to acquire the system information of the second cell. The information indicates which manner the UE should use to acquire the system information of the second cell.

The UE acquires the system information of the second cell in two main manners:

A: The UE directly reads a system broadcast of the second cell to acquire the system information of the second cell.

B: The UE receives the system information of the second cell that is sent by the first base station.

Specifically, the indication message may include a list of cells, and indicates that all system information of the cells included in the list needs to be acquired by the UE by using one of foregoing manner A or manner B; or, the indication message may include a list of frequencies, and indicates that all system information of cells at the frequencies included in the list needs to be acquired by the UE by using one of the foregoing manner A or manner B; or, the indication message may include a list of public land mobile networks (PLMN), and indicates that all system information of cells on PLMNs included in the list needs to be acquired by the UE by using one of the foregoing manner A or manner B.

Step 203: The first base station receives the indication message sent by the second base station.

The indication message is used to instruct the first base station to send a notification message to the UE, and the first base station sends the notification message to the UE by using a managed first cell, where the notification message is used to instruct the UE to acquire the system information of the second cell managed by the second base station.

According to different receiving objects of the indication message sent by the second base station, the first base station may directly receive the indication message sent by the second base station, or may acquire, from the MME, the indication message sent by the second base station.

The first base station may acquire, from the acquired indication message, at least one of the following information:

First: A cell identifier of the second cell managed by the second base station.

The identifier of the second cell managed by the second base station may be cell identifiers of all second cells managed by the second base station or may be an identifier of the second cell in which the system information changes.

In a preferable implementation manner, in the technical solution provided in Embodiment 2 of the present application, if the indication message includes the cell identifier of the second cell, the second cell is a cell in which the system information changes.

The cell identifier includes at least one of the following manners:

A: The cell identifier may be a PCI of the cell and an identifier of a frequency at which the cell is located.

In the technical solution provided in Embodiment 2 of the present application, cells at different frequencies may share one PCI. Therefore, when a PCI is used to identify a cell, the PCI needs to be combined with a frequency identifier, thereby improving accuracy of cell identification.

B: The cell identifier may be an ECGI of the cell.

Second: A time at which the system information of the second cell changes.

The time at which the system information of the second cell changes may be an SFN. The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station for the UE.

Third: Changed content of the system information of the second cell.

The manner may be content that will change in the system information of the second cell. The content that will change in the system information of the second cell may include at least one of the following:

A: A D2D resource configuration.

That is, a receiving or sending resource used by the UE to perform D2D in the second cell.

B: A cell reselection configuration.

C: A block of the system information.

For example, if a D2D resource configuration of the second cell will change, the indication message includes an indication that the D2D resource configuration will change. If a cell reselection configuration of the second cell will change, the indication message includes an indication that the cell reselection configuration will change. If a system information block 19 (SIB19) of the second cell will change, the indication message includes an indication that the SIB19 will change.

Fourth: All or a part of the system information of the second cell.

In the manner, the indication message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

Fifth: A manner for the UE to acquire the system information of the second cell.

The indication message may further include information indicating a manner for the UE to acquire the system information of the second cell. The information indicates which manner the UE should use to acquire the system information of the second cell.

The UE acquires the system information of the second cell mainly in two manners:

A: The UE reads a system broadcast of the second cell to acquire the system information of the second cell.

B: The UE receives the system information of the second cell that is sent by the first base station.

Specifically, the indication message may include a list of cells, and indicates that all system information of the cells included in the list needs to be acquired by the UE by using one of foregoing manner A or manner B; or, the indication message may include a list of frequencies, and indicates that all system information of cells at the frequencies included in the list needs to be acquired by the UE by using one of the foregoing manner A or manner B; or, the indication message may include a list of PLMNs, and indicates that all system information of cells on the PLMNs included in the list needs to be acquired by the UE by using one of the foregoing manner A or manner B.

As can be seen from the foregoing, according to the information included in the indication message received by the first base station, the notification message sent by the first base station to the UE may include the information acquired in the indication message, such as the cell identifier of the second cell managed by the second base station, the time at which the system information of the second cell changes, the changed content of the system information of the second cell, all or a part of the system information of the second cell, and the information indicating a manner for the UE to acquire the system information of the second cell. For specific details, reference is made to the detailed descriptions in the foregoing content, and no further details are provided.

In the foregoing technical solution provided in this embodiment of the present application, when not receiving the indication message sent by the second base station, the first base station may also send the notification message to the UE. In this case, the information in the notification message is generated by the first base station, instead of being sent by the second base station to the first base station by using the indication message. For example, if the second base station does not send the indication message to the first base station, and the first base station determines that the UE needs to acquire the system information of the second cell of the second base station, and determines a manner for the UE to acquire the system information, the first base station may send the notification message to the UE, where the message includes the manner that is determined by the first base station and that is for the UE to acquire the system information of the second cell of the second base station.

After receiving the indication message sent by the second base station, the first base station may also perform appropriate transformation on some information carried in the indication message, then place new information acquired after the transformation into the notification message, and sends the notification message to the UE. For example, the first base station receives the indication message sent by the second base station, where the indication message includes a time at which the system information of the second cell changes, but the time is an SFN of a second cell, and the first base station may transform the SFN of the second cell into an SFN of a first cell, and then use the SFN of the first cell that is acquired through the transformation as the time at which the system information of the second cell changes, place the time into the notification message, and send the notification message to the UE.

Step 204: The first base station sends the notification message to the UE.

That the first base station sends the notification message to the UE may be sending the notification message to all UEs in the first cell, or may be sending the notification message to UE in a D2D communications mode that is in the first cell.

If the first base station sends the notification message to the UE in the D2D communications mode that is in the first cell, the first base station needs to learn which UEs are in a D2D communications mode.

The UE in a D2D communications mode includes at least one of the following:

A: UE in a D2D mode that is in the second cell.

In the manner, UE in a D2D mode that is in the second cell refers to UE that performs a D2D communications mode by using a resource configuration provided by the second cell.

B: UE in a D2D mode that is at a frequency at which the second cell is located.

The first base station learns which UEs are in a D2D communications mode according to at least one of the following manners:

A first manner: The first base station learns the UE in a D2D communications mode from an MME.

In the manner, the first base station acquires, from the MME, the UE in a D2D communications mode.

A second manner: The first base station acquires, from the second base station, the UE in a D2D communications mode.

A third manner: The first base station acquires the stored UE in a D2D communications mode.

In the manner, the first base station pre-stores the information about which UEs are in a D2D communications mode.

In the foregoing three manners, before transmitting data by using a D2D communications mode, the UE needs to perform authentication on the MME, the second base station, or the first base station, and only when the authentication on the MME, the second base station, or the first base station succeeds, the UE can transmit the data in the D2D communications mode. Therefore, one or all of the second base station, the MME, or the first base station stores the information about which UEs are in a D2D communications mode.

Step 205: Receive the notification message sent by the first base station by using a managed first cell.

Step 206: The UE acquires, according to the received notification message, the system information of the second cell managed by the second base station.

The notification message received by the UE is used to instruct the UE to acquire the system information of the second cell managed by the second base station.

The notification message received by the UE may include at least one of the following information:

First: A cell identifier of the second cell managed by the second base station.

The identifier of the second cell managed by the second base station may be cell identifiers of all second cells managed by the second base station or may be an identifier of the second cell in which the system information changes.

In a preferable implementation manner, in the technical solution provided in Embodiment 2 of the present application, if the notification message includes the cell identifier of the second cell, the second cell is a cell in which the system information changes.

The cell identifier includes at least one of the following manners:

A: The cell identifier may be a PCI of the cell and an identifier of a frequency at which the cell is located.

In the technical solution provided in Embodiment 2 of the present application, cells at different frequencies may share one PCI. Therefore, when a PCI is used to identify a cell, the PCI needs to be combined with a frequency identifier, thereby improving accuracy of cell identification.

B: The cell identifier may be an ECGI of the cell.

In the manner, the UE acquires, according to the received notification message, the system information of the second cell managed by the second base station, where the second cell is a second cell corresponding to the cell identifier in the notification message.

Second: A time at which the system information of the second cell changes.

The time at which the system information of the second cell changes may be an SFN. The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station for the UE.

In the manner, the UE acquires, according to the time at which the system information of the second cell changes and that is in the received notification message, the system information of the second cell managed by the second base station.

In a preferable implementation manner, if the notification message further includes the cell identifier, the UE acquires, according to the time at which the system information of the second cell changes and that is in the received notification message, the system information of the second cell corresponding to the cell identifier. For example, the UE may acquire the system information of the second cell at a moment indicated by the information.

In the manner, if the notification message sent by the first base station and received by the UE does not include the time at which the system information of the second cell changes, the UE may acquire the time at which the system information of the second cell changes in the following two manners:

1) When the notification message is received, the system information of the second cell corresponding to a second cell identifier is acquired.

When receiving the notification message sent by the first base station, the UE immediately starts to acquire the system information, in the notification message, of the second cell corresponding to the second cell identifier.

2) The UE determines, according to a time at which the notification message is received, a time to acquire the system information of the second cell, and when the time to acquire the system information of the second cell is reached, acquires the system information of the second cell corresponding to the second cell identifier.

For example, the time may be divided in advance into several continuous system information modification periods (MP), where each MP includes several continuous system frames (SF) of the first cell. If the first base station has sent the notification message to the UE in the $N^{th}$ MP, the UE starts to read the system broadcast of the second cell in the $(N+m)^t$ MP to acquire the system information of the second cell, or the UE starts to initiate a connection request to the first base station in the $(N+m)^{th}$ MP to receive, on the established connection, the system information of the second cell that is sent by the first base station, where a value of m may be 1, 2, 3, or the like, or a value of m may be by default, or pre-configured by the first base station for the UE.

Third: Changed content of the system information of the second cell.

The manner may be about which content in the system information of the second cell will change. The UE acquires, according to the changed content of the system information of the second cell that is in the received notification message, when determining that the system information of the second cell needs to be reacquired, the system information of the second cell managed by the second base station.

In the manner, the notification message includes information about which content in the system information of the second cell will change, and the UE may determine accordingly whether the system information of the second cell needs to be reacquired. The UE determines, according to the information, indicated by the notification message, about which content in the system information of the second cell will change, whether the system information of the second cell needs to be reacquired, and after determining that the system information of the second cell needs to be reacquired, acquires the system information of the second cell corresponding to the second cell identifier.

The content that will change in the system information of the second cell may include at least one of the following:

A: A D2D resource configuration.

That is, a receiving or sending resource used by the UE to perform D2D in the second cell.

B: A cell reselection configuration.

C: A block of the system information.

For example, if a D2D resource configuration of the second cell will change, the notification message includes an indication that the D2D resource configuration will change. If a cell reselection configuration of the second cell will change, the notification message includes an indication that the cell reselection configuration will change. If a system information block 19 (SIB19) of the second cell will change, the notification message includes an indication that the SIB19 will change.

For example, when the notification message includes the information that the D2D resource configuration in the system information of the second cell will change, UE that is using the D2D resource configuration of the second cell needs to reacquire the system information of the second cell, and another UE may not acquire the system information of the second cell.

For another example, when the notification message includes the information that the SIB19 in the system information of the second cell will change, UE that is using the SIB19 of the second cell needs to reacquire the system information of the second cell, and another UE may not acquire the system information of the second cell.

Fourth: All or a part of the system information of the second cell.

In the manner, the notification message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

Fifth: A manner for the UE to acquire the system information of the second cell.

The notification message may further include information indicating a manner for the UE to acquire the system information of the second cell. The information indicates which manner the UE should use to acquire the system information of the second cell. The UE acquires, according to the manner that is for acquiring the system information of the second cell and that is in the received notification message, the system information of the second cell managed by the second base station.

The UE acquires the system information of the second cell in two main manners:

A: The UE reads a system broadcast of the second cell to acquire the system information of the second cell.

B: The UE receives the system information of the second cell that is sent by the first base station.

Specifically, the notification message may include a list of cells, and indicates that all system information of the cells included in the list needs to be acquired by the UE by using one of foregoing manner A or manner B; or, the notification message may include a list of frequencies, and indicates that all system information of cells at the frequencies included in the list needs to be acquired by the UE by using one of the foregoing manner A or manner B; or, the notification message may include a list of PLMNs, and indicates that all system information of cells on PLMNs included in the list needs to be acquired by the UE by using one of the foregoing manner A or manner B.

When the notification message includes all or a part of the system information of the second cell, the UE directly acquires the system information of the second cell from the notification message. When the notification message does not include all or a part of the system information of the second cell, the UE acquires the system information of the second cell according to the fifth information by selecting one of the foregoing two manners. If the fifth information indicates that the UE uses the first manner to acquire the system information of the second cell, the UE reads the system broadcast of the second cell to acquire the system information of the second cell.

If the fifth information indicates that the UE uses the second manner to acquire system information of the second cell, when the UE and the first base station have a connection, the UE receives, on the connection, the system information of the second cell that is sent by the first base station; when the UE and the first base station have no connection, the UE initiates a connection request to the first base station to establish a connection to the first base station and receives, on the established connection, the system information of the second cell that is sent by the first base station.

Embodiment 3

Embodiment 3 of the present application provides an information notification system. For a system architecture, refer to FIG. 1. The system includes at least one second cell, at least one first cell, and at least one UE, and may further include at least one MME. For ease of description, a base station to which a first cell belongs is referred to as a first base station, and a base station to which a second cell belongs is referred to as a second base station. In the following description, a first cell of a first base station and a first cell managed by a first base station have the same meaning, and a second cell of a second base station and a second cell managed by a second base station have the same meaning. The second base station and the first base station may be different base stations, or may be the same base station. When the second base station and the first base station are the same base station, in each embodiment, information exchange between the second base station and the first base station is information exchange between modules inside the same base station.

In the information notification system provided in Embodiment 3 of the present application, multiple second cells may exist at a same frequency, and UE may transmit data in a second cell by using a D2D communications mode.

A second base station is configured to send an indication message.

A first base station manages a first cell, the second base station manages a second cell, and the indication message is a message of the second base station for notifying that system information of the second cell changes.

The first base station is configured to acquire, according to the received indication message, the system information of the second cell managed by the second base station, and send the system information to UE by using the managed first cell.

The indication message sent by the second base station may include at least one of the following information:

First: A cell identifier of the second cell managed by the second base station.

The identifier of the second cell managed by the second base station may be cell identifiers of all second cells managed by the second base station or may be an identifier of the second cell in which the system information changes.

In a preferable implementation manner, in the technical solution provided in Embodiment 2 of the present application, if the indication message includes the cell identifier of the second cell, the second cell is a cell in which the system information changes.

The cell identifier includes at least one of the following manners:

A: The cell identifier may be a PCI of the cell and an identifier of a frequency at which the cell is located.

In the technical solution provided in Embodiment 3 of the present application, cells at different frequencies may share one PCI. Therefore, when a PCI is used to identify a cell, the PCI needs to be combined with a frequency identifier, thereby improving accuracy of cell identification.

B: The cell identifier may be an ECGI of the cell.

In the manner, the first base station acquires system information of the second cell corresponding to the cell identifier.

In a preferable implementation manner, the first base station establishes a connection to the second base station, and acquires the system information of the second cell corresponding to the cell identifier; and/or the first base station establishes a connection to an MME, and acquires the system information of the second cell corresponding to the cell identifier.

Second: A time at which the system information of the second cell changes.

The time at which the system information of the second cell changes may be an SFN. The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station.

In the manner, the UE acquires, according to the time at which the system information of the second cell changes and that is in the received indication message, the system information of the second cell managed by the second base station.

In a preferable implementation manner, if the indication message further includes the cell identifier, the first base station acquires, according to the time at which the system information of the second cell changes and that is in the received notification message, the system information of the second cell corresponding to the cell identifier. For example, the first base station may acquire the system information of the second cell at a time indicated by the information.

In the manner, if the indication message received by the first base station does not include the time at which the system information of the second cell changes, the first base station may acquire the time at which the system information of the second cell changes in the following two manners:

1) When the notification message is received, the system information of the second cell corresponding to a second cell identifier is acquired.

When receiving the indication message, the first base station immediately starts to acquire the system information, in the indication message, of the second cell corresponding to the second cell identifier.

2) The first base station determines, according to a time at which the indication message is received, a time to acquire the system information of the second cell, and when the time to acquire the system information of the second cell is reached, acquires the system information of the second cell corresponding to the second cell identifier.

For example, the time may be divided in advance into several continuous system information MPs, where each MP includes several continuous SFs of the first cell. If the second base station has sent the indication message to the first base station in the $N^{th}$ MP, the first base station starts to read the system broadcast of the second cell in the $(N+m)^{th}$ MP to acquire the system information of the second cell.

Third: Changed content of the system information of the second cell.

The manner may be content that will change in the system information of the second cell. The content that will change in the system information of the second cell may include at least one of the following:

A: A D2D resource configuration.

That is, a receiving or sending resource used by the UE to perform D2D in the second cell.

B: A cell reselection configuration.

C: A block Block of the system information.

For example, if a D2D resource configuration of the second cell will change, the indication message includes an indication that the D2D resource configuration will change. If a cell reselection configuration of the second cell will change, the indication message includes an indication that the cell reselection configuration will change. If an SIB19 of the second cell will change, the indication message includes an indication that the SIB19 will change.

Fourth: All or a part of the system information of the second cell.

In the manner, the indication message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

The UE is configured to acquire the system information of the second cell that is sent by the first base station.

Embodiment 4

Based on the information notification system provided in the foregoing Embodiment 3, Embodiment 4 of the present application provides an information notification method. The technical solution provided in Embodiment 4 of the present application includes at least one second cell, at least one first cell, and at least one UE, and may further include at least one MME. For ease of description, a base station to which a first cell belongs is referred to as a first base station, and a base station to which a second cell belongs is referred to as a second base station. In the following description, a first cell of a first base station and a first cell managed by a first base station have the same meaning, and a second cell of a second base station and a second cell managed by a second base station have the same meaning. The second base station and the first base station may be different base stations, or may be the same base station. When the second base station and the first base station are the same base station, in each embodiment, information exchange between the second base station and the first base station is information exchange between modules inside the same base station.

Figure 3:
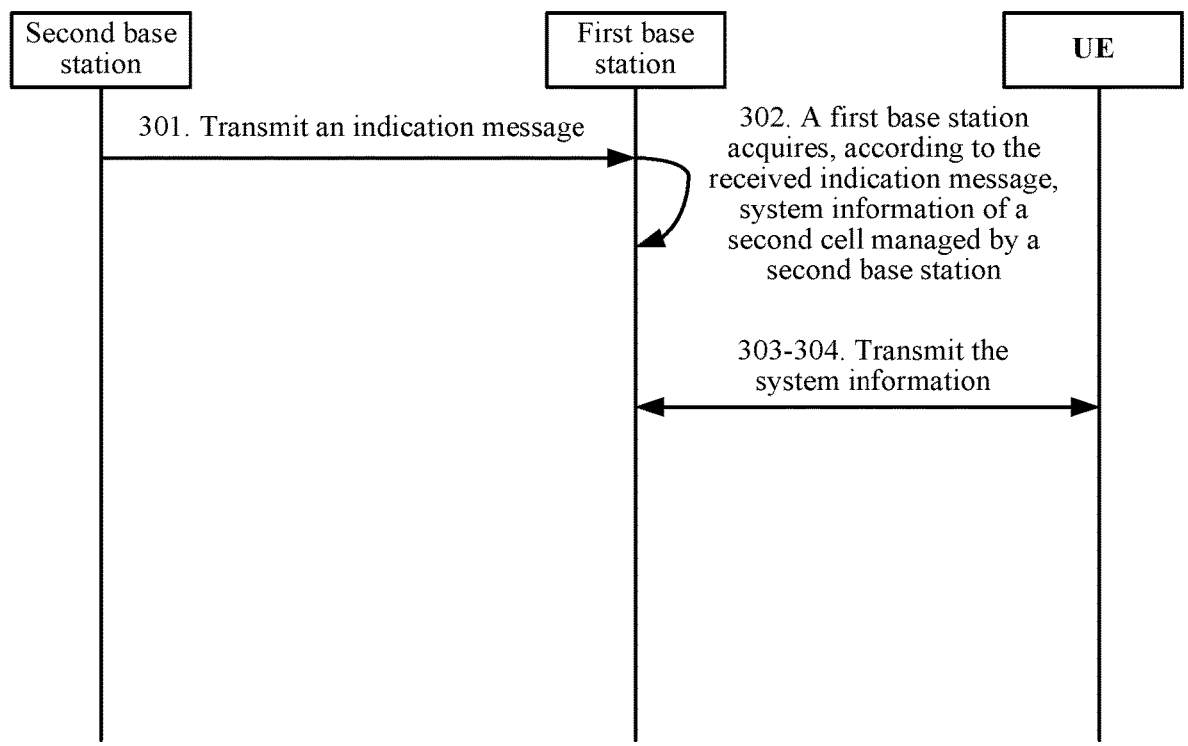
FIG. 3 is a flowchart of an information notification method according to Embodiment 4 of the present application.

Multiple second cells may exist at a same frequency, and UE may transmit data in a second cell by using a D2D communications mode. As shown in FIG. 3, a specific processing procedure is as follows.

Step 301: A second base station sends an indication message.

A first base station manages a first cell, the second base station manages a second cell, and the indication message is a message of the second base station for notifying that system information of the second cell changes.

Step 302: A first base station acquires, according to the received indication message, system information of a second cell managed by the second base station.

The indication message sent by the second base station may include at least one of the following information:

First: A cell identifier of the second cell managed by the second base station.

The identifier of the second cell managed by the second base station may be cell identifiers of all second cells managed by the second base station or may be an identifier of the second cell in which the system information changes.

In a preferable implementation manner, in the technical solution provided in Embodiment 4 of the present application, if the indication message includes the cell identifier of the second cell, the second cell is a cell in which the system information changes.

The cell identifier includes at least one of the following manners:

A: The cell identifier may be a PCI of the cell and an identifier of a frequency at which the cell is located.

In the technical solution provided in Embodiment 4 of the present application, cells at different frequencies may share one PCI. Therefore, when a PCI is used to identify a cell, the PCI needs to be combined with a frequency identifier, thereby improving accuracy of cell identification.

B: The cell identifier may be an ECGI of the cell.

In the manner, the first base station acquires system information of the second cell corresponding to the cell identifier.

In a preferable implementation manner, the first base station establishes a connection to the second base station, and acquires the system information of the second cell corresponding to the cell identifier; and/or the first base station establishes a connection to an MME, and acquires the system information of the second cell corresponding to the cell identifier.

Second: A time at which the system information of the second cell changes.

The time at which the system information of the second cell changes may be an SFN. The SFN indicates a system frame of the first cell or the second cell, and the second cell may change the system information at a start moment or an end moment of the system frame. Alternatively, the second cell may also change the system information at a predetermined moment after the system frame. For example, if the time at which the system information of the second cell changes indicates a system frame N of the first cell, the second cell changes the system information at a start moment or an end moment of a system frame N+m of the first cell, where m may be 1, 2, 3 or the like, and the value is by default in the system, or pre-configured by the first base station.

In the manner, the UE acquires, according to the time at which the system information of the second cell changes and that is in the received indication message, the system information of the second cell managed by the second base station.

In a preferable implementation manner, if the indication message further includes the cell identifier, the first base station acquires, according to the time at which the system information of the second cell changes and that is in the received notification message, the system information of the second cell corresponding to the cell identifier. For example, the first base station may acquire the system information of the second cell at a time indicated by the information.

In the manner, if the indication message received by the first base station does not include the time at which the system information of the second cell changes, the first base station may acquire the time at which the system information of the second cell changes in the following two manners:

1) When the notification message is received, the system information of the second cell corresponding to a second cell identifier is acquired.

When receiving the indication message, the first base station immediately starts to acquire the system information, in the indication message, of the second cell corresponding to the second cell identifier.

2) The first base station determines, according to a time at which the indication message is received, a time to acquire the system information of the second cell, and when the time to acquire the system information of the second cell is reached, acquires the system information of the second cell corresponding to the second cell identifier.

For example, the time may be divided in advance into several continuous system information MPs, where each MP includes several continuous SFs of the first cell. If the second base station has sent the indication message to the first base station in the $N^{th}$ MP, the first base station starts to read the system broadcast of the second cell in the $(N+m)^{th}$ MP to acquire the system information of the second cell.

Third: Changed content of the system information of the second cell.

The manner may be content that will change in the system information of the second cell. The content that will change in the system information of the second cell may include at least one of the following:

A: A D2D resource configuration.

That is, a receiving or sending resource used by the UE to perform D2D in the second cell.

B: A cell reselection configuration.

C: A block Block of the system information.

For example, if a D2D resource configuration of the second cell will change, the indication message includes an indication that the D2D resource configuration will change. If a cell reselection configuration of the second cell will change, the indication message includes an indication that the cell reselection configuration will change. If an SIB19 of the second cell will change, the indication message includes an indication that the SIB19 will change.

Fourth: All or a part of the system information of the second cell.

In the manner, the indication message may include all of the system information of the second cell, that is, may be latest system information of the second cell, or may be a part of latest system information of the second cell. For example, if a D2D resource configuration in the system information of the second cell changes, the information may be system information, of the second cell, that includes the changed D2D resource configuration, or may be only the changed D2D resource configuration.

Step 303: The first base station sends the system information to UE by using a managed first cell.

Step 304: The UE acquires the system information of the second cell that is sent by the first base station.

Embodiment 5

Figure 4:
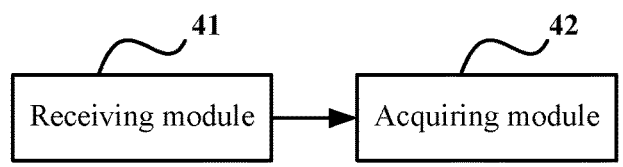
FIG. 4 is a schematic structural composition diagram of an information notification apparatus according to Embodiment 5 of the present application.

Correspondingly, Embodiment 5 of the present application provides a user terminal whose structural composition is shown in FIG. 4, including:

a receiving module 41, configured to receive a notification message that is sent by a first base station by using a managed first cell, where the notification message is used to instruct UE to acquire system information of a second cell managed by a second base station;

and an acquiring module 42, configured to acquire, according to the received notification message, the system information of the second cell managed by the second base station.

Specifically, the notification message includes a cell identifier of the second cell; and the acquiring module 42 is specifically configured to acquire, according to the cell identifier of the second cell that is included in the received notification message, the system information of the second cell managed by the second base station.

Specifically, the notification message includes a time at which the system information of the second cell changes; and the acquiring module 42 is specifically configured to acquire, according to the time at which the system information of the second cell changes and that is in the received notification message, the system information of the second cell managed by the second base station.

Specifically, the notification message includes changed content of the system information of the second cell; and the acquiring module 42 is specifically configured to acquire, according to the changed content of the system information of the second cell that is in the received notification message, when it is determined that the system information of the second cell needs to be reacquired, the system information of the second cell managed by the second base station.

Specifically, the notification message includes information indicating a manner for the UE to acquire the system information of the second cell; and the acquiring module 42 is specifically configured to acquire, according to the manner that is for acquiring the system information of the second cell and that is indicated by the received notification message, the system information of the second cell managed by the second base station, where the manner for acquiring the system information of the second cell is: reading the system information of the second cell that is broadcast by the second cell; or receiving the system information of the second cell that is sent by the first cell.

Specifically, the acquiring module 42 is specifically configured to: read, according to the received notification message, the system information of the second cell that is broadcast by the second cell; or if the UE is in an idle state, establish a connection to the first cell, and acquire the system information of the second cell on the established connection.

Figure 5:
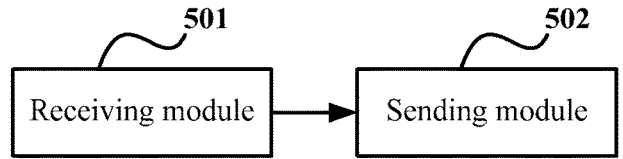
FIG. 5 is a schematic structural composition diagram of a first base station according to Embodiment 5 of the present application.

Correspondingly, Embodiment 5 of the present application further provides a first base station, which, as shown in FIG. 5, includes:

The receiving module 501 is configured to receive an indication message sent by a second base station, where the indication message is used to instruct the first base station to send a notification message to user equipment UE.

Specifically, the receiving module 501 is specifically configured to directly receive the indication message sent by the second base station; or receive the indication message sent by the second base station and forwarded by a mobility management entity MME.

The sending module 502 is configured to send the notification message to the UE by using a managed first cell, where the notification message is used to instruct the UE to acquire system information of a second cell managed by the second base station.

Specifically, the indication message includes a cell identifier of the second cell; and the notification message that the sending module 502 is specifically configured to send to the UE by using the managed first cell further includes the cell identifier of the second cell.

Specifically, the indication message includes a time at which the system information of the second cell changes; and the notification message that the sending module 502 is specifically configured to send to the UE by using the managed first cell further includes the time at which the system information of the second cell changes.

Specifically, the indication message further includes changed content of the system information of the second cell; and the notification message that the sending module 502 is specifically configured to send to the UE by using the managed first cell further includes the changed content of the system information of the second cell.

Specifically, the indication message further includes information indicating a manner for the UE to acquire the system information of the second cell; and the notification message that the sending module 502 is specifically configured to send to the UE by using the managed first cell further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

Optionally, the first base station further includes: an acquiring module, configured to acquire UE in a device to device D2D communications mode, where the sending module is specifically configured to send the notification message to the acquired UE by using the managed first cell.

Specifically, the acquiring module is specifically configured to acquire the UE in a D2D communications mode according to at least one of the following manners: acquiring, from an MME, the UE in a D2D communications mode; acquiring, from the second base station, the UE in a D2D communications mode; or acquiring the UE in a D2D communications mode stored in the first base station.

Specifically, the UE in a D2D communications mode that is acquired by the acquiring module includes at least one of the following: UE that performs a D2D communications mode by using a resource configuration provided by the second cell; or UE in a D2D communications mode at a frequency at which the second cell is located.

Figure 6:
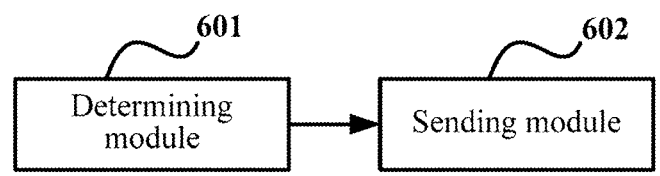
FIG. 6 is a schematic structural composition diagram of a second base station according to Embodiment 5 of the present application.

Correspondingly, this embodiment of the present application further provides a second base station, which, as shown in FIG. 6, includes:

a determining module 601, configured to determine whether user equipment UE needs to acquire system information of a second cell managed by the second base station; and a sending module 602, configured to: when it is determined that the UE needs to acquire the system information of the second cell managed by the second base station, send an indication message to a first base station, where the indication message is used to instruct the first base station to send a notification message to the UE by using a managed first cell, and the notification message is used to instruct the UE to acquire the system information of the second cell managed by the second base station.

Specifically, the sending module 602 is specifically configured to directly send the indication message to the first base station; or forward the indication message to the first base station by using a mobility management entity MME.

The indication message includes a cell identifier of the second cell.

Specifically, the indication message that the sending module 602 is specifically configured to send to the first base station further includes the cell identifier of the second cell.

The indication message includes a time at which the system information of the second cell changes.

Specifically, the indication message that the sending module 602 is specifically configured to send to the first base station further includes the time at which the system information of the second cell changes.

The indication message further includes changed content of the system information of the second cell.

Specifically, the indication message that the sending module 602 is specifically configured to send to the first base station further includes the changed content of the system information of the second cell.

The indication message further includes information indicating a manner for the UE to acquire the system information of the second cell.

Specifically, the indication message that the sending module 602 is specifically configured to send to the first base station further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

Embodiment 6

Figure 7:
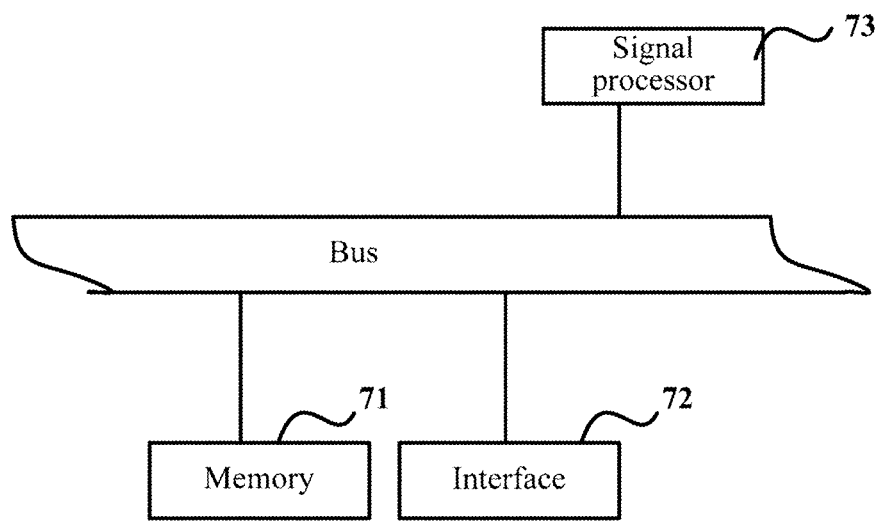
FIG. 7 is a schematic structural composition diagram of a user terminal according to an embodiment of the present application.

Embodiment 6 of the present application provides a user terminal, which, as shown in FIG. 7, includes: a memory 71, an interface 72, and a signal processor 73.

The memory 71 is configured to store a program instruction.

The memory may be a volatile memory, for example, a random-access memory (RAM); or a non-volatile memory, for example, a flash memory, a hard disk drive (HDD), or a solid-state drive (SSD); or a combination of the foregoing types of memories.

The interface 72 is configured to receive a notification message that is sent by a first base station by using a managed first cell, where the notification message is used to instruct UE to acquire system information of a second cell managed by a second base station.

The interface may be one or more of the following: a network interface controller (NIC) providing a wired interface, for example, an Ethernet network NIC, where the Ethernet network NIC may provide a copper and/or fiber interface; and an NIC providing a wireless interface, for example, a wireless local area network (WLAN) NIC.

The signal processor 73 is configured to acquire, according to the program instruction stored in the memory and the notification message received by the interface, the system information of the second cell managed by the second base station.

The signal processor 73 is configured to acquire, according to program code stored in the memory 71, a metadata index value corresponding to updated metadata transmitted by the interface 72.

The signal processor may be a central processing unit (CPU), or a combination of a CPU and a hardware chip. The signal processor may further be a network processor (NP), or a combination of a CPU and an NP, or a combination of an NP and a hardware chip.

The hardware chip may be one or a combination of more of the following: an application-specific integrated circuit (ASIC), a field-programmable gate array (FPGA), and a complex programmable logic device (CPLD).

Specifically, the notification message includes a cell identifier of the second cell; and the signal processor 73 is specifically configured to acquire, according to the cell identifier of the second cell that is included in the received notification message, the system information of the second cell managed by the second base station.

Specifically, the notification message includes a time at which the system information of the second cell changes; and the signal processor 73 is specifically configured to acquire, according to the time at which the system information of the second cell changes and that is in the received notification message, the system information of the second cell managed by the second base station.

Specifically, the notification message includes changed content of the system information of the second cell; and the signal processor 73 is specifically configured to acquire, according to the changed content of the system information of the second cell that is in the received notification message, when it is determined that the system information of the second cell needs to be reacquired, the system information of the second cell managed by the second base station.

Specifically, the notification message includes information indicating a manner for the UE to acquire the system information of the second cell; and the signal processor 73 is specifically configured to acquire, according to the manner that is for acquiring the system information of the second cell and that is indicated by the received notification message, the system information of the second cell managed by the second base station, where the manner for acquiring the system information of the second cell is: reading the system information of the second cell that is broadcast by the second cell; or receiving the system information of the second cell that is sent by the first cell.

Specifically, the signal processor 73 is specifically configured to: read, according to the received notification message, the system information of the second cell that is broadcast by the second cell; or if the UE is in an idle state, establish a connection to the first cell, and acquire the system information of the second cell on the established connection.

Correspondingly, this embodiment of the present application further provides a first base station whose structural composition is the same as the structure shown in FIG. 7, including: a memory 71, an interface 72, and a signal processor 73.

The memory 71 is configured to store a program instruction.

The memory may be a volatile memory, for example, a random-access memory (RAM); or a non-volatile memory, for example, a flash memory, a hard disk drive (HDD), or a solid-state drive (SSD); or a combination of the foregoing types of memories.

The interface 72 is configured to receive an indication message sent by a second base station, where the indication message is used to instruct the first base station to send a notification message to user equipment UE.

The interface may be one or more of the following: a network interface controller (NIC) providing a wired interface, for example, an Ethernet network NIC, where the Ethernet network NIC may provide a copper and/or fiber interface; and an NIC providing a wireless interface, for example, a wireless local area network (WLAN) NIC.

The signal processor 73 is configured to send, according to the program instruction stored in the memory, the notification message to the UE by using a managed first cell, where the notification message is used to instruct the UE to acquire system information of a second cell managed by the second base station.

The signal processor 73 is configured to acquire, according to program code stored in the memory 71, a metadata index value corresponding to updated metadata transmitted by the interface 72.

The signal processor may be a central processing unit (CPU), or a combination of a CPU and a hardware chip. The signal processor may further be a network processor (NP), or a combination of a CPU and an NP, or a combination of an NP and a hardware chip.

The hardware chip may be one or a combination of more of the following: an application-specific integrated circuit (ASIC), a field-programmable gate array (FPGA), and a complex programmable logic device (CPLD).

Specifically, the interface 72 is specifically configured to directly receive the indication message sent by the second base station; or receive the indication message sent by the second base station and forwarded by a mobility management entity MME.

Specifically, the indication message includes a cell identifier of the second cell; and the notification message that the signal processor 73 is specifically configured to send to the UE by using the first cell managed by the first base station further includes the cell identifier of the second cell.

Specifically, the indication message includes a time at which the system information of the second cell changes; and the notification message that the signal processor 73 is specifically configured to send to the UE by using the first cell managed by the first base station further includes the cell identifier of the second cell.

Specifically, the indication message further includes changed content of the system information of the second cell; and the notification message that the signal processor 73 is specifically configured to send to the UE by using the first cell managed by the first base station further includes the changed content of the system information of the second cell.

Specifically, the indication message further includes information indicating a manner for the UE to acquire the system information of the second cell; and the notification message that the signal processor 73 is specifically configured to send to the UE by using the first cell managed by the first base station further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

Specifically, the signal processor 73 is further configured to acquire UE in a device to device D2D communications mode; and send the notification message to the acquired UE by using the first cell managed by the first base station.

Specifically, the signal processor 73 is specifically configured to acquire the UE in a D2D communications mode according to at least one of the following manners: acquiring, from an MME, the UE in a D2D communications mode; acquiring, from the second base station, the UE in a D2D communications mode; or acquiring the UE in a D2D communications mode stored in the first base station.

Specifically, the UE in a D2D communications mode that the signal processor 73 is specifically configured to acquire includes at least one of the following: UE that performs a D2D communications mode by using a resource configuration provided by the second cell; or UE in a D2D communications mode at a frequency at which the second cell is located.

This embodiment of the present application further provides a second base station whose structural composition is the same as that in FIG. 7, including: a memory 71, an interface 72, and a signal processor 73.

The interface may be one or more of the following: a network interface controller (NIC) providing a wired interface, for example, an Ethernet network NIC, where the Ethernet network NIC may provide a copper and/or fiber interface; and an NIC providing a wireless interface, for example, a wireless local area network (WLAN) NIC.

The memory 71 is configured to store a program instruction.

The memory may be a volatile memory, for example, a random-access memory (RAM); or a non-volatile memory, for example, a flash memory, a hard disk drive (HDD), or a solid-state drive (SSD); or a combination of the foregoing types of memories.

The signal processor 73 is configured to determine, according to the program instruction stored in the memory, whether user equipment UE needs to acquire system information of a second cell managed by the second base station; and when it is determined that the UE needs to acquire the system information of the second cell managed by the second base station, send an indication message to a first base station by using the interface 72, where the indication message is used to instruct the first base station to send a notification message to the UE by using a managed first cell, and the notification message is used to instruct the UE to acquire the system information of the second cell managed by the second base station.

The signal processor may be a central processing unit (CPU), or a combination of a CPU and a hardware chip. The signal processor may further be a network processor (NP), or a combination of a CPU and an NP, or a combination of an NP and a hardware chip.

Specifically, the signal processor 73 is specifically configured to directly send the indication message to the first base station; or forward the indication message to the first base station by using a mobility management entity MME.

Specifically, the indication message includes a cell identifier of the second cell; and the indication message that the signal processor 73 is specifically configured to send to the first base station further includes the cell identifier of the second cell.

Specifically, the indication message includes a time at which the system information of the second cell changes; and the indication message that the signal processor 73 is specifically configured to send to the first base station further includes the time at which the system information of the second cell changes.

Specifically, the indication message further includes changed content of the system information of the second cell; and the indication message that the signal processor 73 is specifically configured to send to the first base station further includes the changed content of the system information of the second cell.

Specifically, the indication message further includes information indicating a manner for the UE to acquire the system information of the second cell; and the indication message that the signal processor 73 is specifically configured to send to the first base station further includes the information indicating a manner for the UE to acquire the system information of the second cell, where the manner for the UE to acquire the system information of the second cell is: reading, by the UE, the system information of the second cell that is broadcast by the second cell; or receiving, by the UE, the system information of the second cell that is sent by the first cell.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the present application have been described, persons skilled in the art can make changes and modifications to these embodiments once they learn the basic inventive concept. Therefore, the following claims are intended to be construed as to cover the exemplary embodiments and all changes and modifications falling within the scope of the present application.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. An information notification method at a user terminal or a processor at the user terminal in a device-to-device communication system, the method comprising:
    receiving, a notification message from a first cell serving the user terminal, wherein the notification message comprises information indicating a manner to acquire device-to-device resource configuration of a second cell; and
    acquiring, according to the notification message, the device-to-device resource configuration of the second cell, wherein the manner to acquire the device-to-device resource configuration of the second cell indicated in the notification message is reading the device-to-device resource configuration of the second cell that is broadcast by the second cell.

2. The method according claim 1, wherein the notification message further comprises a list of frequencies and indicates a manner to acquire device-to-device resource configurations of cells at the frequencies in the list of frequencies.

3. The method according claim 1, wherein the notification message further comprises a list of public land mobile networks (PLMNs) and indicates a manner to acquire device-to-device resource configurations of cells on the PLMNs in the list of PLMNs.

4. An information notification method at a base station or a processor at the base station in a device-to-device communication system, the method comprising:
    determining, for a user terminal served by a first cell, information indicating a manner to acquire device-to-device resource configuration of a second cell;
    sending a notification message to the user terminal, wherein the notification message includes the information indicating the manner to acquire the device-to-device resource configuration of the second cell,
    wherein the manner to acquire the device-to-device resource configuration of the second cell indicated in the notification message comprises reading the device-to-device resource configuration of the second cell that is broadcast by the second cell.

5. The method according to claim 4, wherein the notification message further comprises a list of frequencies and indicates a manner to acquire device-to-device resource configurations of cells at the frequencies in the list of frequencies.

6. The method according to claim 4, wherein the notification message further comprises a list of public land mobile networks (PLMNs) and indicates a manner to acquire device-to-device resource configurations of cells on the PLMNs in the list of PLMNs.

7. An apparatus in a device-to-device communication system, which is a user terminal or a processor at the user terminal, the apparatus comprising:
- a receiving circuit configured to receive a notification message from a first cell serving the user terminal, wherein the notification message comprises information indicating a manner to acquire device-to-device resource configuration of a second cell; and
- a processing circuit configured to acquire, according to the notification message, device-to-device resource configuration of the second cell, wherein the manner to acquire the device-to-device resource configuration of the second cell indicated in the notification message is reading the device-to-device resource configuration of the second cell that is broadcast by the second cell.

8. The apparatus according to claim 7, wherein the notification message further comprises a list of frequencies and indicates a manner to acquire device-to-device resource configurations of cells at the frequencies in the list of frequencies.

9. The apparatus according to claim 7, wherein the notification message further comprises a list of public land mobile networks (PLMNs) and indicates a manner to acquire device-to-device resource configurations of cells on the PLMNs in the list of PLMNs.

10. An apparatus in a device-to-device communication system, which is a base station or a processor at the base station, the apparatus comprising:
- a processing circuit is configured to determine for a user terminal served by a first cell, information indicating a manner to acquire device-to-device resource configuration of a second cell;
- a sending circuit is configured to send a notification message to the user terminal, wherein the notification message includes the information indicating the manner to acquire the device-to-device resource configuration of the second cell,
- wherein the manner to acquire the device-to-device resource configuration of the second cell indicated in the notification message comprises reading the device-to-device resource configuration of the second cell that is broadcast by the second cell.

11. The apparatus according to claim 10, wherein the notification message further comprises a list of frequencies and indicates a manner to acquire device-to-device resource configurations of cells at the frequencies in the list of frequencies.

12. The apparatus according to claim 10, wherein the notification message further comprises a list of public land mobile networks (PLMNs) and indicates a manner to acquire device-to-device resource configurations of cells on the PLMNs in the list of PLMNs.

* * * * *